US007000574B2

(12) United States Patent
Ahner et al.

(10) Patent No.: US 7,000,574 B2
(45) Date of Patent: Feb. 21, 2006

(54) METHOD OF OPERATING A COOLING-AND HEATING CIRCUIT OF A MOTOR VEHICLE, AND A COOLING-AND HEATING CIRCUIT FOR A MOTOR VEHICLE

(75) Inventors: Peter Ahner, Boeblingen (DE); Manfred Ackermann, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/621,172

(22) Filed: Jul. 17, 2003

(65) Prior Publication Data

US 2004/0026074 A1 Feb. 12, 2004

(30) Foreign Application Priority Data

Jul. 26, 2002 (DE) ................................ 102 34 087

(51) Int. Cl.
*F01P 7/02* (2006.01)

(52) U.S. Cl. .................................................... 123/41.12

(58) Field of Classification Search ............... 123/41.1, 123/41.12, 41.44
See application file for complete search history.

(56) References Cited

U.S. PATENT DOCUMENTS 4,554,891 A * 11/1985 Hayashi .................... 123/41.21
5,036,803 A * 8/1991 Nolting et al. ............. 123/41.1
5,215,044 A * 6/1993 Banzhaf et al. .......... 123/41.29
5,809,945 A * 9/1998 Creeron et al. .......... 123/41.14
6,178,928 B1 * 1/2001 Corriveau ................ 123/41.12

FOREIGN PATENT DOCUMENTS

DE 37 38 412 A1 5/1989
DE 199 25 986 A1 12/2000
EP 0 499 071 A1 8/1992
FR 2 799 505 4/2001
WO 96/03574 2/1996

* cited by examiner

*Primary Examiner*—Henry C. Yuen
*Assistant Examiner*—Hyder Ali
(74) *Attorney, Agent, or Firm*—Michael J. Strike

(57) ABSTRACT

A method of operating a cooling and heating circuit of a motor vehicle driven by an internal combustion engine includes providing a first cooling medium path through a bypass conduit, a second cooling medium path through a main cooler of the internal combustion engine, a third cooling medium path through a heating heat exchanger, subdividing the cooling medium paths by an electrically actuated valves and forming cooling medium flows by an electrically driven pump, controlling both the valves and the pump by an electronic control unit in dependence on operational and environmental parameters as well as nominal values, reversing a feeding direction of the electrically operated pump in a first operational phase of the internal combustion engine at low temperatures of the internal combustion engine and turned on first cooling medium path, and feeding the cooling medium by the pump in a lower region of the internal combustion engine.

22 Claims, 2 Drawing Sheets

METHOD OF OPERATING A COOLING-AND HEATING CIRCUIT OF A MOTOR VEHICLE, AND A COOLING-AND HEATING CIRCUIT FOR A MOTOR VEHICLE

BACKGROUND OF THE INVENTION

The present invention relates a method of operating a cooling- and heating circuit of a motor vehicle, and a cooling- and heating circuit for a motor vehicle.

Known cooling devices for motor vehicles with an internal combustion engine as a rule include a cooling- and heating circuit with several cooling medium channels in order to distribute and sometimes withdraw waste heat in the sense of a thermal management in the internal combustion engine and auxiliary aggregates such as for example turbo charger, transmission, generator, etc. Operational and environmental parameters, such as for the example the temperatures and/or the pressure conditions of the medium, the rotary speed, the load and the temperature of the internal combustion engine, the components and aggregates, as well as the temperature of the surrounding air and the passenger compartment are detected as input signals in an electronic control unit, and processed to form output signals for controlling of mainly electrically operated feeding and adjusting devices.

Such a cooling device is disclosed for example in the European patent document EP 0 499 071 81. It includes a first cooling medium circuit for cooling the internal combustion engine. Further, the machine oil and the charge air are cooled by additional oil cooler and charge air cooler by means of air. A control unit which has at least one microprocessor determines, depending on a plurality of measured condition variables the cooling power demand, the cooling power demand or heat demand of each individual aggregate or component of the cooling system and regulates the cooling medium flows individually, but with consideration of the whole system. For controlling the material- and heat flows, electrically controlled pumps and valves are provided. Further, additional, regulatable heating devices are connected to the cooling device, for example for heating of the passenger space or the wiping water of a windshield window wiping device, so that excessive heat energy can be used for heating when needed.

German patent document DE 37 38 412 81 discloses a device and a method for regulating the temperature of an internal combustion engine. The cooling medium circulates in a cooling circuit which is composed of several cooling medium channels. A first cooling medium channel leads through a bypass conduit, a second cooling medium channel leads through a main cooler of the internal combustion engine, and a third cooling medium channel leads through a heat exchanger which serves for climatization of the passenger space. The cooling medium distribution is performed by electrically operated valves at the branches of the cooling medium channel. In addition, in the cooling medium circuit a mechanical pump which is driven by the internal combustion engine to be cooled and electrically driven pump connected in series are arranged. During transportation of the cooling medium the mechanical pumps take a base load, while the feeding power of the electrical pump is controllable.

During a cold start the cooling medium, while bypassing the cooler flows through the bypass conduit back to the internal combustion engine, and is supplied in a lower region, namely in the region of the cylinder block. This small circuit brings little cooling power, so that the internal combustion engine reaches its operational temperature fast and the fuel consumption is reduced in advantageous manner. With increase of the cooling medium temperature a valve opens the second cooling medium channel with the main cooler, which when needed cooperates with a jalousie and a blower and withdraws the excessive heat of the cooling medium. A heating heat exchanger is arranged in a third cooling medium channel, and a part of the cooling medium flow is supplied through it when needed, for heating the passenger space.

If the cooling power of the heating heat exchanger is sufficient, the cooling medium channel with the main cooler is completely blocked. The excessive heat is supplied in this operational condition exclusively into the passenger space, which is desirable in particular at low exterior temperatures. During the heating phase of the internal combustion engine as a rule the heat generated during combustion is used for fast reaching of the operational temperature of the internal combustion engine, to lower the fuel consumption and to reduce the emission of damaging substances. The cooling medium flow through the heating heat exchanger is substantially reduced or completely blocked, so that during this time for cost of comfort only a small or no energy for heating of the passenger space is available.

SUMMARY OF THE INVENTION

It is therefore an object of the present invention to provide a method of operating a cooling- and heating circuit of a motor vehicle, and a cooling- and heating circuit for a motor vehicle, which avoid the disadvantages of the prior art.

In keeping with these objects and with others which will become apparent hereinafter, one feature of the present invention resides, briefly stated, in that, at moderate and high surrounding temperatures the feeding device of an electrically driven pump is reversed in a first operational phase of the internal combustion engine and at low temperature to the internal combustion engine and turned on first cooling medium channel, so that the pump feeds the cooling medium into a lower region of the internal combustion engine. With this reverse, the cooler cooling medium volume flow of the internal combustion engine passes first in the region of the cylinder head and acts thereon the heat combustion chamber, in which a fuel air mixture periodically is ignited and burned. By the high temperatures and great temperature differences, the cooling medium can receive more heat and give it away during passage of the cylinder block again, so that the internal combustion engine is heated fast also in its lower region. This region is warmed up only by the combustion gasses cooled during the expansion and is therefore cooler.

In the warming up phase of the internal combustion engine the fuel is intensely condensed, is transported by the piston movement and the gas flow and through the exhaust is expelled into environment without being combusted. By reversing the pump rotary direction the heat is supplied over the shortest path from the hot cylinder head to the cooler motor block, which leads to a simultaneous heating of the cylinder wall and reduces the condensate formation. The reduction of the row emission has the priority relative to the higher fuel consumption because of cold machine oil, since the cold catalyst can not convert contaminates.

The reverse of the flow direction can be performed by a rotary direction change of the electric motor for driving the pump or by a valve system.

In accordance with a further embodiment, in a first operational phase of the internal combustion engine the pump is stopped and the heat transferred through the thermal syphon action is avoided or reduced by closing the valves to bypass and/or to heat circuit.

The rotary direction reversible pump is more powerful than a valve with closing position at the outlets to bypass in and to a main cooler, and is more expensive than a valve system for reversing the flow direction.

In accordance with a further embodiment, in the case of lower outside temperatures, the inner space heating is preferred to the heating of the internal combustion engine.

A heat exchanger is arranged in the region of the cylinder block. In the second phase the thermal energy can be transmitted by it from the cooling medium to the machine oil of the internal combustion engine, so that its viscosity is improved and the movable parts of the internal combustion engine slide well and produce a lower friction. In the first operational phase in condition of lower temperatures this heat exchanger is however blocked by a pre-switched valve and the cooling medium flows exclusively or mainly via the first cooling medium path, a bypass conduit back to the cylinder head. The produced increase friction contributes in an advantageous manner to a faster heating of the motor block. With increasing heat yield the oil cooler can be however involved. In order to reduce the heat withdrawal of the cooler outwardly in this operational regions, it is proposed in accordance with a further embodiment to extend the bypass conduit in the housing of the internal combustion engine, and to provide thermal insulation and/or a small length.

A valve regulates the cooling medium flow through the bypass conduit and is arranged on a branch of this conduit. In the first operational phase it provides a second cooling medium path via a main cooler completely. The position of this valve and the valve before the oil cooler as well as the feeding direction and rotary speed of the pump are regulated by an electronic control unit which evaluates first of all temperatures of the internal combustion engine. A first temperature sensor detects the temperature of the cooling medium and in particular in normal flow direction of the cooling medium, as considered at the output of the cylinder head. A second temperature sensor measures the temperature at the inlet. The temperature of the machine oil is measured by means of a third temperature sensor. In correspondence with the measuring data, then the control unit, in addition to the valve positions, determines also the flow direction of the cooling medium through the bypass conduit, by sending a corresponding signal to the pump. The control of the heat flow with respect to the cylinder block and the machine oil allows to provide an acceptable compromise between the minimization of the condensation formation with a cold cylinder block and a minimization of friction during heating of the machine oil.

Since the determination of temperatures is relatively sluggish, the control unit evaluates also other parameters, which allow to make conclusions about the temperature course, for example the rotary speed and the load of the internal combustion engine. In addition to these conventional parameters, the time of the year and/or the operational location of the internal combustion engine can be determined for conversion between the first operational phase and further operational phases. The time of the year, in particular in connection with the operational location, provides a good starting point with respect to the expected environmental temperatures. The operational location provides a further conclusion through the height over the sea level and thereby the atmospheric pressure which is important for operation of the internal combustion engine.

The time of the year can be determined in a simple manner by a board clock and/or a board computer, while the operational location can be determined by means of a navigation device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
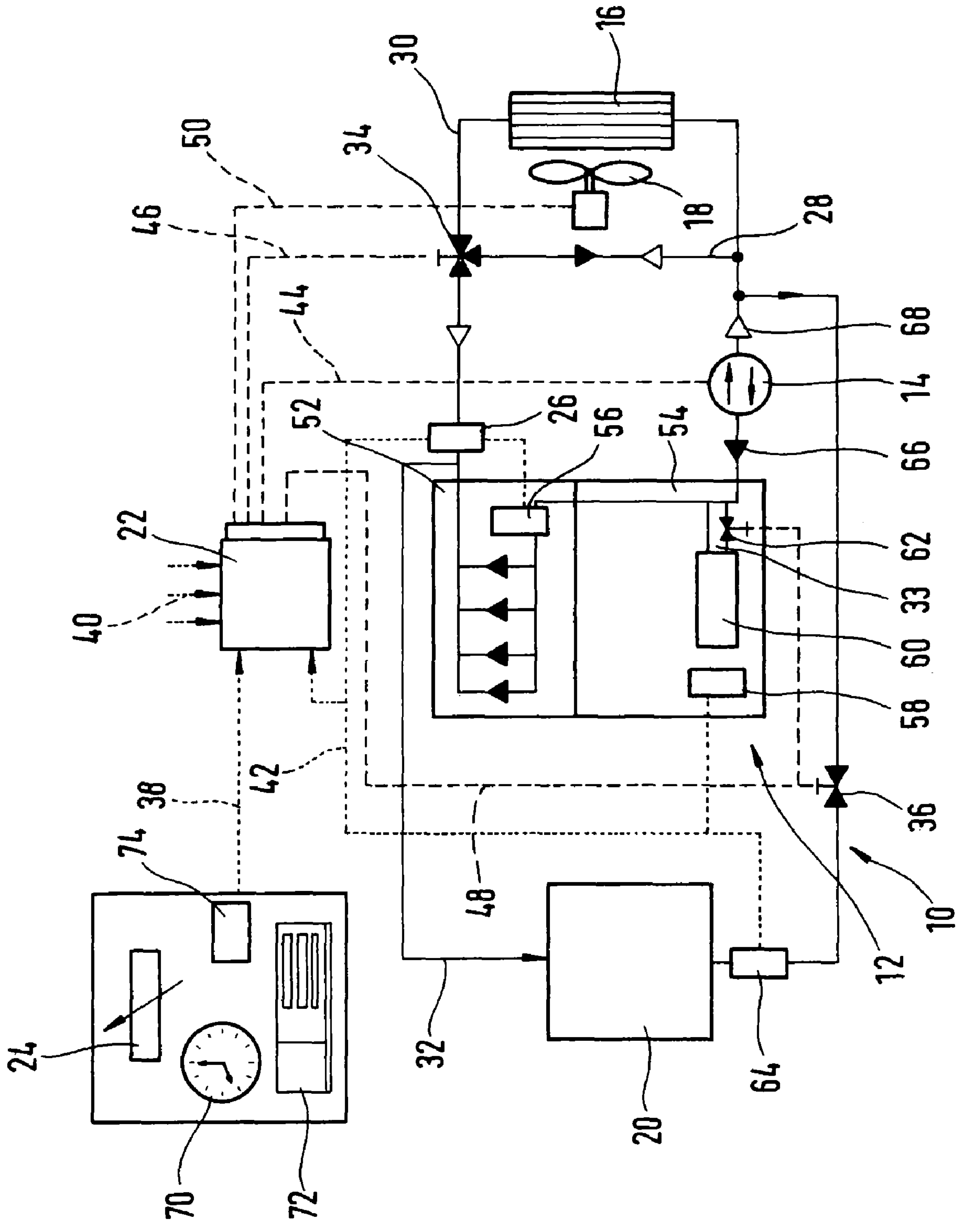
FIG. 1 is a view schematically showing a cooling-and heating circuit of a vehicle.

FIG. 1 shows an example of a cooling and heating circuit for a vehicle in accordance with the present invention. An internal combustion engine 12 with a cylinder head 52 and a cylinder block 54 is connected to a cooling and heating circuit 10 provided with a pump 4 which in normal operation supplies a cooling medium in direction of the arrows. The pump 14 is driven by a regulatable electric motor and supplies the cooling medium from the internal combustion 12 through a first cooling medium path 28, a bypass conduit, directly back to the internal combustion engine 12. The first cooling medium path 28 is used for bringing the internal combustion engine 12 fast after a cold start to its operational temperature. For avoiding heat losses, it is advantageous when the bypass conduit 28 extends in the housing of the internal combustion engine 12, is heat insulated and/or has a small length.

A second cooling medium path 30 to a main cooler 16 is provided parallel to the bypass conduit 28. It cooperates with a fan 18 and draws excess heat of the cooling medium. A control valve 34 which is arranged on the branch of the second cooling medium path 30 distributes the cooling medium flow to the cooler 16 and/or the bypass conduit 28. The control valve 34 can be formed as a 3-way valve or in form of 2 two-way valves. An electrically heatable thermostat valve or an electrically operating proportional valve can be used as such valves.

The cooling medium flows through a third cooling medium path 32 from the internal combustion 12 to a heating heat exchanger 20, and from there back to the internal combustion engine 12. The heating heat exchanger 12 serves for providing heat for a passenger space of a not shown motor vehicle. A control valve 36 is arranged in the cooling medium path 32 for definitely reducing the cooling medium flow through the heating heat exchanger 20.

The volume flows in the cooling and heating circuit 10 of the internal combustion engine 12 are regulated by a control unit 22. The control unit 22 receives data through direct signal conductors or through a data bus, for example CAN (Control Area Network) or LIN (Local Area Network), and processes them to provide output signals for the adjusting devices of the cooling and heating circuit 10. As input signals 40, operational and environmental parameters are supplied to the control unit 22, such as for example the rotary speed, the load and the temperature of the internal combustion engine 12, the speed of the vehicle, as well as the temperature of the surrounding air and the passenger space, etc. Also, the temperature of the cooling medium is transmitted as an input signal 42 to the control unit 22, and it is detected at several positions in the cooling and heating circuit 10. A temperature sensor 64 measures the temperature of the cooling medium in the first cooling medium path 32 in the region of the heating heat exchanger 20, so that the heat yield in the passenger space can be determined.

A temperature sensor 26 measures the temperature at the output of the internal combustion engine 12 and a further temperature sensor 56 measures the temperature at the inlet of the cooling medium in the cylinder head 52. In a first operational phase in cold weather when it takes a long time until the internal combustion engine 12 reaches its operational temperature, excessive heat produced during the combustion of the fuel must be used for heating of the functionally important components and in some cases for increase of comfort. For this purpose the cooling and heating circuit 10 is operated for example with the first, short cooling medium path 28 through the bypass conduit.

In order to accelerate the heating of the internal combustion engine 12 by shortening the heat flux from the hot cylinder 52 to the cold cylinder block 54, the feeding direction of the pump is reversed. For example its rotary direction is reversed from by the control unit 22, or the cooling medium flow is correspondingly redirected by controllable valves in the pump 14. The pump 14 supplies the cooling medium now in the flow direction 68 as identified by open arrows, opposite to the normal flow direction 66 identified by closed arrows, through the bypass conduit 28 to the cylinder head 52. The cooling medium takes in the cylinder head 52 the waste heat produced during the combustion of the fuel and transports it by through flows of the internal combustion engine 12 over the short path in the region of the cylinder block 54. Thereby the cooling medium flow counteracts the thermal syphon action, so that the heat is uniformly distributed in the internal combustion engine.

When the nominal values stored in the control unit 22 are reached, the control unit 22 switches again the feeding direction of the pump 14, so that the cooling medium in the second operational phase provides a supply in the normal flow direction 66. In correspondence with the measured temperature values of the cooling medium, corresponding cooling medium paths 28, 30, 32 are released, by the output signals 46 and 48 which control the position of the control valves 34, 36 and the output signal 44 which controls the rotary speed and the feeding direction or rotary direction of the pump 14. The output signal 50 determines the power of the fan 18, which for example improves the heat withdrawal through the main cooler 16, when the temperature of the cooling medium is very high.

An outside temperature $t_a$ in the region smaller than +5° C. is considered as. “cold”. Outside temperatures $t_a$ of approximately +5° C. to +25° C. fall in a “moderate” temperature region, and temperatures $t_a$ of over +25° C. are defined as a “warm” temperature region. This threshold values for the switching conditions of the heat flow are considered as approximate values and depend for example on combustion chamber of the motor.

For reducing the friction of the movable parts and thereby improving the efficiency of the internal combustion engine 12, the machine oil is warmed up. For this purpose a heat exchanger 60 is provided. It is arrangement in the region of the cylinder block 54 and connected to the heating and cooling medium circuit 10. The heat exchanger 60 is first turned on when the cooling medium reaches a predetermined threshold value and is blocked in the first operational phase by a control valve 62. The temperature of the machine oil is detected by a temperature sensor 58 and transmitted as an input signal 42 to the control unit 22.

The inventive method provides advantages, in particular when the outside operational conditions of the internal combustion 12 are unfavorable, for example in cold time of the year and/or with low air pressure. The control unit 22 processes informations about the time of the year and the operational location of the internal combustion 12. The time of the year can be detected easily by a board clock 70 and/or a board computer 72, while a navigation device 74 can provide informations about the operational location in form of an input signal 38. For balancing comfort requirements with an optimal operation of the internal combustion engine 12, the control unit 22 processes as an output signal 38 the signals of a service device 24 which characterizes the heat requirements of the occupants.

Figure 2:
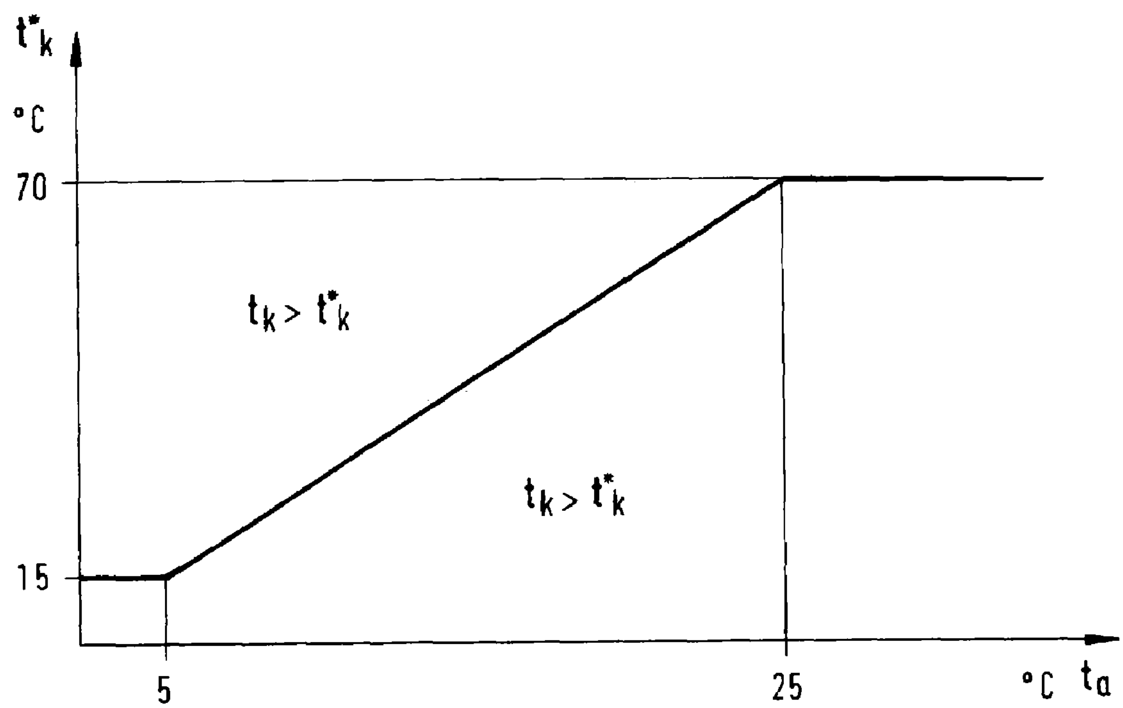
FIG. 2 is a view showing an embodiment for the functional dependency of the switching threshold value $t_k$* as the function of the outside temperature $t_a$.

FIG. 2 shows a possible functional dependency of the threshold value $t_k^*$ for the cooling medium feeding pump and the position of the valve from the outside temperature $t_a$. As described herein above, during cold start of the internal combustion engine, the valve 34, 36, 62 to the oil cooler 60 and for the vehicle heating are advantageously closed, and the cooling medium flow is supplied backwards from the cylinder head 52 to the motor block 54.

In warming up running phase of the internal combustion engine the threshold value $t_k^*$ for the switching of the flow direction from “backwards” to “forwards” as well as the switching of the oil cooling, and in some cases also the opening of the heat valve 36, is dependent for example from the outside temperature $t_a$ or the moisture in the passenger compartment.

For example, with cold outside temperatures, which typically must be in the region of up to +5° C., a switching of the flow direction from “backwards” to “forwards” as well as the simultaneous opening of the heat valve 36 is performed at cooling medium temperatures $t_k$, characterized as follows:

$$t_k > t_k^* = (t_a + 10^\circ \text{ C.}) \qquad \text{(A)}$$

$t_k$ identifies the cooling medium temperature, $t_k^*$ identifies the threshold value for the switching of the feeding pump and in some cases the valves which regulate the cooling medium path and $t_a$ identifies the outside temperature of the vehicle.

Alternatively, a simplified equation can be provided:

$$t_k > t_k^* = 20^\circ \text{ C.} \qquad \text{(B)}$$

for controlling the valve and correspondingly the pump.

For outside temperatures $t_a$ in the region of approximately +5° C. to approximately +25° C., which are considered as moderate temperatures, for example a continuous increase of the threshold value $t_k^*$ shown in FIG. 2 can be used, in dependence on the outside temperature $t_a$. Alternative characteristic lines, such as for example in a stepped operational course can be also provided in the control device.

For warm outside temperatures $t_a$ in the region of, for example higher than +25° C., a switching of the flow direction of the cooling medium from “backwards” to “forwards” is performed at a threshold condition for the cooling medium temperature $t_k$ as follows:

$$t_k > t_k^* = 70^\circ \text{ C.} \qquad \text{(C)}$$

The heat valve 36 is no longer open at these outside temperatures.

The given threshold values $t_k$* for the environmental conditions are approximate standard values which can be for example dependent on the size of the combustion chamber. Starting from approximately 60° C. cooling medium temperature $t_k$ it can be considered that the wall temperature in the interior of the combustion chamber is located above the evaporation temperature of Otto fuels. Starting from this temperature limit the friction reduction by "oil heating" or in other words the use of oil heat exchanger 60 through the fourth cooling medium path 33 is more important than the condensate reduction in the combustion chamber.

When because of an increased moisture in the passenger compartment for example a window coating is generated which can be detected by a corresponding moisture sensor, then a switching direction from the feeding direction from "backwards" to "forwards" can be performed and independently from the outside temperature. The position of the heat valve therefore corresponds to the environmental parameters, in particular the outside temperature. The heat valve can be adjusted for example so that by a corresponding cooling of the inner space it is dried for reducing the window coating. Correspondingly, depending on the outside temperature, also the heating can be activated by the heat valve 36, so that the system is adjusted to a corresponding temperature requirement.

It will be understood that each of the elements described above, or two or more together, may also find a useful application in other types of methods and constructions differing from the types described above.

While the invention has been illustrated and described as embodied in method of operating a cooling- and heating circuit of a motor vehicle, and a cooling- and heating circuit for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of operating a cooling and heating circuit of a motor vehicle driven by an internal combustion engine, comprising the steps of providing a first cooling medium path through a bypass conduit, a second cooling medium path through a main cooler of the internal combustion engine, a third cooling medium path through a heating heat exchanger; subdividing the cooling medium paths by electrically actuated valves and forming the cooling medium flows by an electrically driven pump; controlling both the valve and the pump by an electronic control unit in dependence on operational and environmental parameters as well as nominal values; reversing a feeding direction of the electrically operated pump in a first operational phase of the internal combustion engine at low temperatures of the internal combustion engine and turned on first cooling medium path; and feeding the cooling medium by the pump in a lower region of the internal combustion engine.

2. A method as defined in claim 1; and further comprising providing a fourth cooling medium path through an oil heat exchanger.

3. A method of operating a cooling and heating circuit of a motor vehicle driven by an internal combustion engine, comprising the steps of providing a first cooling medium path through a bypass conduit, a second cooling medium path through a main cooler of the internal combustion engine, a third cooling medium path through a heating heat exchanger subdividing the cooling medium paths by electrically actuated valves and forming the cooling medium flows by an electrically driven pump; controlling both the valve and the pump by an electronic control unit in dependence on operational and environmental parameters as well as nominal values; reversing a feeding direction of the electrically operated pump in a first operational phase of the internal combustion engine at low temperatures of the internal combustion engine and turned on first cooling medium path; and feeding the cooling medium by the pump in a lower region of the internal combustion engine; detecting at least one parameter selected from the group consisting of a time of the year, an operational location of the internal combustion engine and both; and evaluating said at least one parameter for regulation of the cooling medium flows by the control unit.

4. A method as defined in claim 3; and further comprising using for detection of the time of the year a component selected from the group consisting of a board clock, a board computer, and both.

5. A method as defined in claim 3; and further comprising using for detection of the operational location of the internal combustion engine at least one navigation device.

6. A method as defined in claim 1; and further comprising opening one of the valves toward a heating circuit at cold outside temperatures.

7. A method of operating a cooling and heating circuit of a motor vehicle driven by an internal combustion engine, comprising the steps of providing a first cooling medium path through a bypass conduit, a second cooling medium path through a main cooler of the internal combustion engine, a third cooling medium path through a heating heat exchanger; subdividing the cooling medium paths by electrically actuated valves and forming the cooling medium flows by an electrically driven pump; controlling both the valves and the pump by an electronic control unit in dependence on operational and environmental parameters as well as nominal values; and avoiding a cooling medium feeding by a thermal syphon action; by closing the valves in a first operational phase of the internal combustion engine at low temperatures of the internal combustion engine in an engine inlet conduit or an engine outlet conduit to suppress the thermal syphon action.

8. A method of operating a cooling and heating circuit of a motor vehicle driven by an internal combustion engine, comprising the steps of providing a first cooling medium path through a bypass conduit, a second cooling medium path through a main cooler of the internal combustion engine, a third cooling medium path through a heating heat exchanger; subdividing the cooling medium paths by electrically actuated valves and forming the cooling medium flows by an electrically driven pump; controlling both the valves and the pump by an electronic control unit in dependence on operational and environmental parameters as well as nominal values; reducing a cooling medium feeding by closing one of the valves at cold outside temperatures in a first operational phase of the internal combustion engine at low temperatures in an engine inlet conduit or an engine outlet conduit to suppress the thermal syphon action; and opening the other valve to a heating circuit.

9. A cooling and heating circuit of a motor vehicle driven by an internal combustion engine, comprising a bypass conduit through which a first cooling medium path extends; a main cooler of the internal combustion engine through which a second cooling medium path extends; a heating heat exchanger through which a third cooling medium path extends; electrically operated valves which subdivide the cooling medium paths; an electrically driven pump which provides cooling medium flows; an electronic control device which controls said valves and said pump depending on operational and environmental parameters so that a feeding direction of said electrically driven pump in a first operational phase of the internal combustion engine at low temperatures of the internal combustion engine and with the first cooling medium path turned on is reversed, and said pump supplies a cooling medium in a lower region of said internal combustion engine.

10. A cooling and heating circuit as defined in claim 9, wherein said bypass conduit of said first cooling medium path is short.

11. A cooling and heating circuit 9, wherein said bypass conduit extends in a housing of the internal combustion engine.

12. A cooling and heating circuit 9, wherein said bypass conduit is heat insulated.

13. A cooling and heating circuit of a motor vehicle driven by an internal combustion engine, comprising a bypass conduit through which a first cooling medium path extends; a main cooler of the internal combustion engine through which a second cooling medium path extends; a heating heat exchanger through which a third cooling medium path extends; electrically operated valves which subdivide the cooling medium paths; an electrically driven pump which provides cooling medium flows; an electronic control device which controls said valves and said pump depending on operational and environmental parameters, so that in a first operational phase of the internal combustion engine at low temperatures of the internal combustion engine a cooling medium supply by thermal syphon action is avoided by closing of one of said valves and closing of the other of said valves in an engine conduit or an engine outlet conduit to suppress the thermal syphon action.

14. A cooling and heating circuit as defined in claim 13, wherein said bypass conduit of said first cooling medium path is short.

15. A cooling and heating circuit 13, wherein said bypass conduit extends in a housing of the internal combustion engine.

16. A cooling and heating circuit 13, wherein said bypass conduit is heat insulated.

17. A cooling and heating circuit of a motor vehicle driven by an internal combustion engine, comprising a bypass conduit through which a first cooling medium path extends; a main cooler of the internal combustion engine through which a second cooling medium path extends; a heating heat exchanger through which a third cooling medium path extends; electrically operated valves which subdivide the cooling medium paths; an electrically driven pump which provides cooling medium flow; an electronic control device which controls said valves and said pump depending on operational and environmental parameters, so that at cold outside temperatures in a first operational phase of the internal combustion engine at low temperatures a cooling medium supply by thermal syphon action is reduced with one of said valves closed, and the other of said valves is open to a heating circuit.

18. A cooling and heating circuit as defined in claim 17 wherein said bypass conduit of said first cooling medium path is short.

19. A cooling and heating circuit 17, wherein said bypass conduit extends in a housing of the internal combustion engine.

20. A cooling and heating circuit 17, wherein said bypass conduit is heat insulated.

21. A method of operating a cooling and heating circuit of a motor vehicle driven by an internal combustion engine, comprising the steps of providing a first cooling medium path through a bypass conduit, a second cooling medium path through a main cooler of the internal combustion engine, a third cooling medium path through a heating heat exchanger; subdividing the cooling medium paths by electrically actuated valves and forming the cooling medium flows by an electrically driven pump; controlling both the valves and the pump by an electronic control unit in dependence on operational and environmental parameters as well as nominal values; and preventing a cooling medium feeding by a thermal syphon action with the pump stopped, by closing the valves in a first operational phase of the internal combustion engine at low temperatures of the internal combustion engine.

22. A cooling and heating circuit of a motor vehicle driven by an internal combustion engine, comprising a bypass conduit through which a first cooling medium path extends; a main cooler of the internal combustion engine through which a second cooling medium path extends; a heating heat exchanger through which a third cooling medium path extends; electrically operated valves which subdivide the cooling medium paths; an electrically driven pump which provides cooling medium flows; an electronic, control device which controls said valves and said pump depending on operational and environmental parameters, so that in a first operational phase of the internal combustion engine at low temperatures of the internal combustion engine a cooling medium supply by thermal syphon action with the pump stopped is prevented by closing of one of said valves and closing of the other of said valves.

* * * * *